Patented Oct. 10, 1939

2,175,581

UNITED STATES PATENT OFFICE 2,175,581

PREPARATION OF ACETYLENIC CARBINOLS

Thomas H. Vaughn, Niagara Falls, N. Y., assignor to Union Carbide and Carbon Research Laboratories, Inc., a corporation of New York No Drawing. Application October 19, 1937,
Serial No. 169,802

18 Claims. (Cl. 260—642)

This invention relates to the production of acetylenic carbinols; and more especially it concerns the production of 3-methyl butyne-1,ol-3, its homologues and analogues, by the pyrolysis of an acetylenic glycol, such as a symmetrically substituted 1,4-butynediol.

Methods already are known for producing 3-methyl butinol by reacting acetone and acetylene in the presence of alkaline substances such as metallic sodium, sodium alcoholates and potassium hydroxide. Under certain conditions the reaction proceeds further, with the formation of 2,5 dimethyl-2,5 dihydroxyhexyne-3, more commonly known as acetylene pinacol. Since for many applications, the acetylenic carbinols are more valuable than the corresponding glycols, a method for the conversion of acetylenic glycols to the corresponding acetylenic carbinols in good yields has considerable industrial value.

According to the present invention an acetylienc glycol, such as a substituted 1,4-butynediol, is heated and reacted, preferably under atmospheric pressure or under subatmospheric pressure, at an elevated temperature around its boiling point or thereabove. For example, when heating acetylene pinacol under atmospheric pressure, it is preferred to employ temperatures within the range from 180° to 210° C., although highly satisfactory results are secured at temperatures as low as 100° C. At temperatures much above 300° C., side reactions occur which reduce the yields of the desired acetylenic carbinol.

The type of reaction involved may be represented by the following equation, in which R and R² designate the same or different alkyl radicals:

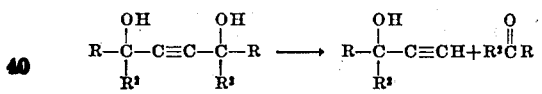

The pyrolysis of the substituted 1,4-butynediol may be effected in either the liquid phase or vapor phase. It occurs very rapidly when the vapors of the acetylenic glycol are passed over an inert material such as sand, glass, or porous filter stone maintained at a suitable elevated temperature in a reaction tube.

The conversion of the acetylenic glycol may be conducted in the presence of small amounts of alkali metal carbonates, or similar materials not capable of effecting the decomposition of the acetylenic carbinols, such as the alkaline earth metal hydroxides and carbonates. In fact, when employing starting materials other than acetylene pinacol, it is highly desirable to conduct the pyrolysis in the presence of a few per cent of such weakly basic compound adapted to promote pyrolysis of the acetylenic glycol while preventing or minimizing decomposition of the acetylenic carbinol to produce acetylene and a ketone. These reaction promoters also give efficient service in connection with the pyrolysis of acetylene pinacol, but their action is especially noteworthy in connection with the pyrolysis of the higher homologues of the latter. On the other hand, caustic alkalies, either dry or in solution, cause active decomposition of the acetylenic carbinol to acetylene and a ketone. Acidic compounds are ineffective. Thus they definitely inhibit the conversion of acetylene pinacol to dimethylethynylcarbinol.

The vapors are removed from the reaction vessel containing the acetylenic glycol as rapidly as formed, and are fractionally condensed. The fraction containing the desired acetylenic carbinol is refractionated, preferably under atmospheric pressure or thereabouts, and the acetylenic carbinol separately recovered therefrom.

The following examples serve to illustrate the invention:

Example 1

71 grams of acetylene pinacol were placed in a 500 c. c modified Claisen flask connected to a cooled receiver and were heated for three hours under reflux. The temperature at the top of the column connected with the flask was above the boiling point of any decomposition product formed, but below the boiling point of acetylene pinacol itself. 60 grams of distillate boiling between 56° and 110° C. collected in the receiver during the distillation. 7 grams of acetylene pinacol remained in the distilling flask. Fractional distillation of the 56°-110° C. fraction yielded a mixture of acetone and dimethylethynylcarbinol. On the first fractionation 25 grams of pure dimethylethynylcarbinol were obtained. Refractionation of the foreruns considerably raised these yields. Indeed, the acetylenic glycol was substantially quantitatively converted to the corresponding tertiary acetylenic carbinol. No gas nor other by-products were produced in noticeable amounts.

Example 2

36 grams of the acetylenic glycol, 1,4 diethyl-1,4 dimethyl butyne-2, diol-1,4 having admixed therewith 2 grams of powdered anhydrous potassium carbonate, were distilled under atmospheric pressure, the reaction being smooth and readily controllable with the production of 34 grams of distillate. Upon fractionally distilling this distillate under atmospheric pressure, approximately 11.5 grams of methylethyl ketone, 14.5 grams of methylethylethynylcarbinol, and 6.5 grams of unconverted acetylenic glycol were obtained. This corresponds to a yield of around 75 to 80% of the acetylenic carbinol, based upon the amount of acetylenic glycol reacted, with a reaction efficiency of between 95 and 100 per cent. The potassium carbonate was left in the distilling flask in a substantially unchanged condition, and it appears likely that this compound actually functions as a catalyst. This carbonate, like the other alkali metal carbonates, does not actively decompose acetylenic carbinols to acetylene and ketones, either when used in the dry form or in solution.

The vapor phase pyrolysis of acetylenic glycols such as acetylene pinacol is not essentially different from the liquid phase pyrolysis. The solid materials over which the vapors are passed in the reaction zone function merely as heat transfer agencies and take no part in the reaction. An example of the vapor phase decomposition of acetylene pinacol follows.

*Example 3*

A quantity of crystals of acetylene pinacol was introduced through a trap into the top of a glass reaction tube packed with small lumps of a porous filter stone which consists essentially of silica and is marketed under the trade name "Filtros". The tube and contents were maintained at a temperature within the range from 275° to 300° C.

The crystals quickly melted, and the resultant liquid boiled within the said reaction zone, the vapors thereof being forced through the tube under their own pressure. The vapors thus formed were condensed in a cooled receiver. After filtering the condensate to remove unchanged acetylene pinacol, the filtrate was fractionally distilled under atmospheric pressure, in the manner described in Example 1. A good yield of dimethylethynylcarbinol and acetone were obtained. A small amount of tar remained in the reaction tube due to further decomposition of some acetylene pinacol or of the carbinols. Improved yields of the desired carbinol are secured when the pyrolysis is conducted at temperatures below 275° C.

*Example 4*

27 grams of the glycol symmetrical dimethyldiamylbutynediol, melting at 75°–79° C., and produced by reacting methylamyl ketone and acetylene in the presence of an alkali, had admixed therewith 2 grams of finely divided calcium hydroxide. The mixture was placed in a modified Claisen flask and was distilled at atmospheric pressure. The highest temperature reached at the top of the column was 180° C. A small amount of gas was evolved. The vapors formed were recovered and condensed; and the condensate was refractionated, giving excellent yields of methylamylethynylcarbinol, boiling at 88°–90° C. under an absolute pressure of 30 mm. of mercury, and of amylmethyl ketone.

It will be understood that this invention is in no sense limited to the treatment of the particular acetylenic glycols specifically mentioned in the aforegoing examples. On the contrary, the invention is adapted for the pyrolysis of a wide range of alkyl-substituted 1,4-butynediols, and particularly 1,4 symmetrically dialkyl-substituted butyne-2, diol-1,4 homologues, for the production therefrom of alkyl-substituted butinols, such as the alkyl-substituted butyne-1,ol-3 compounds.

The invention is susceptible of modification within the scope of the appended claims.

I claim:

1. Process for producing an acetylenic carbinol, which comprises pyrolizing an acetylenic glycol, and separately recovering the acetylenic carbinol thus produced.

2. Process for producing an acetylenic carbinol, which comprises pyrolizing the vapors of an acetylenic glycol in a pyrolizing zone, and recovering from the resultant vaporous reaction products the acetylenic carbinol thus produced.

3. Process for producing an acetylenic carbinol, which comprises pyrolizing a flowing stream of vapors of an acetylenic glycol in a pyrolizing zone, removing the vaporous reaction products from said zone as rapidly as formed, and recovering from the reaction products the acetylenic carbinol present therein.

4. Process for producing an acetylenic carbinol, which comprises pyrolizing an acetylenic glycol in the presence of a compound adapted to promote the conversion of the said acetylenic glycol to an acetylenic carbinol while minimizing decomposition of the latter, the said compound being selected from the group consisting of the alkali metal carbonates, the alkaline earth metal carbonates, and the alkaline earth metal hydroxides, and separately recovering the acetylenic carbinol thus produced.

5. Process for producing an acetylenic carbinol, which comprises pyrolizing an acetylenic glycol at a temperature not substantially below its boiling point, under a pressure around atmospheric, condensing the resultant vapors substantially as rapidly as formed, fractionally distilling the resultant distillate, and separately recovering the acetylenic carbinol present therein.

6. Process for producing an ethynyl carbinol, which comprises heating and reacting a symmetrically alkyl-substituted 1,4-butynediol at a temperature not substantially below its boiling point, condensing the resultant vapors substantially as rapidly as formed, fractionally distilling the resultant distillate, and separately recovering the acetylenic carbinol present therein.

7. Process for producing an ethynyl carbinol, which comprises heating and reacting a symmetrically dialkyl substituted 1,4-butynediol at a temperature within the range from around 100° C. to around 300° C., condensing the resultant vapors, fractionally distilling the distillate thus produced, and separately recovering therefrom the ethynyl carbinol.

8. Process as defined in claim 7 wherein the said heating and reacting is conducted in the presence of an alkali metal carbonate.

9. Process for producing an ethynyl carbinol, which comprises heating and reacting a symmetrically alkyl-substituted 1,4-butynediol at a temperature not substantially below its boiling point, in the presence of a compound promoting the said reaction and selected from the group consisting of the alkali metal carbonates, the alkaline earth metal carbonates and the alkaline earth metal hydroxides, condensing the vapors thus produced, fractionally distilling the resultant distillate, and separately recovering therefrom the ethynyl carbinol present therein.

10. Process as defined in claim 9, wherein the said compound is an alkali metal carbonate.

11. Process as defined in claim 9, wherein the said compound is potassium carbonate.

12. Process as defined in claim 9, wherein the said compound is an alkaline earth metal hydroxide.

13. Process as defined in claim 9, wherein the said compound is calcium hydroxide.

14. Process for producing an alkyl-substituted butyne-1,ol-3, which comprises distilling a 1,4 symmetrically alkyl-substituted butyne-2, diol-1,4, isolating and condensing the resultant vapors substantially as rapidly as formed, fractionally distilling the distillate thus produced, and separately recovering the alkyl-substituted butyne-1, ol-3 present therein.

15. Process as defined in claim 14 wherein the said butyne-2, diol-1,4 being distilled contains a small amount of a compound adapted to promote pyrolysis of the same to form an alkyl-substituted butyne-1, ol-3 but which does not substantially promote decomposition of the latter to form acetylene and a ketone, the said compound being selected from the group consisting of the alkali metal carbonates, the alkaline earth metal carbonates, and the alkaline earth metal hydroxides.

16. Process as defined in claim 14 wherein the said distillation is conducted in the presence of an alkali metal carbonate.

17. Process for producing 3-methyl butyne-1, ol-3 which comprises distilling 1,4 symmetrically dimethyl-substituted butyne-2, diol-1,4, isolating and condensing the resultant vapors, fractionally distilling the distillate thus produced, and separately recovering the 3-methyl butyne-1,ol-3 present therein.

18. Process as defined in claim 17 wherein the said distillation is conducted at a temperature within the range from around 100° C. to around 300° C. and under a pressure around atmospheric pressure.

THOMAS H. VAUGHN.